April 26, 1927.  1,626,005
C. J. G. MALMBERG ET AL
APPARATUS FOR DETERMINING THE PERCENTAGE OF CARBON IN A
SPECIMEN OF IRON OR STEEL
Original Filed Feb. 5, 1921  3 Sheets-Sheet 1
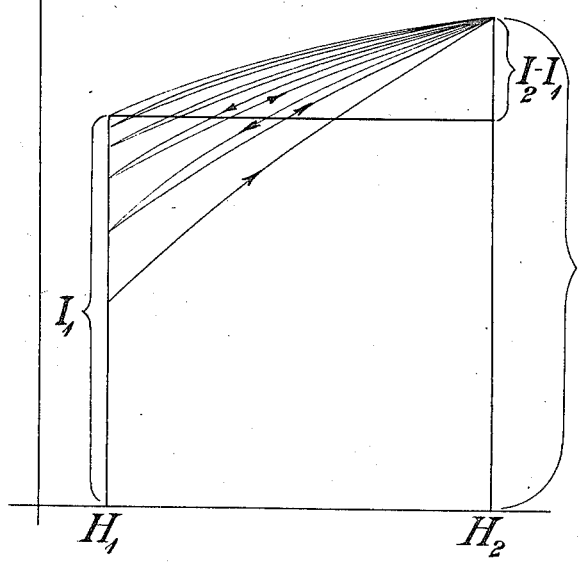
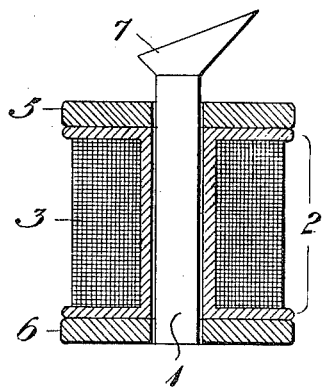
INVENTORS:
CARL JOHAN GUNNAR MALMBERG
JOHAN GUNNAR HOLMSTRÖM
BY: Francis E. Boyce
ATTORNEY

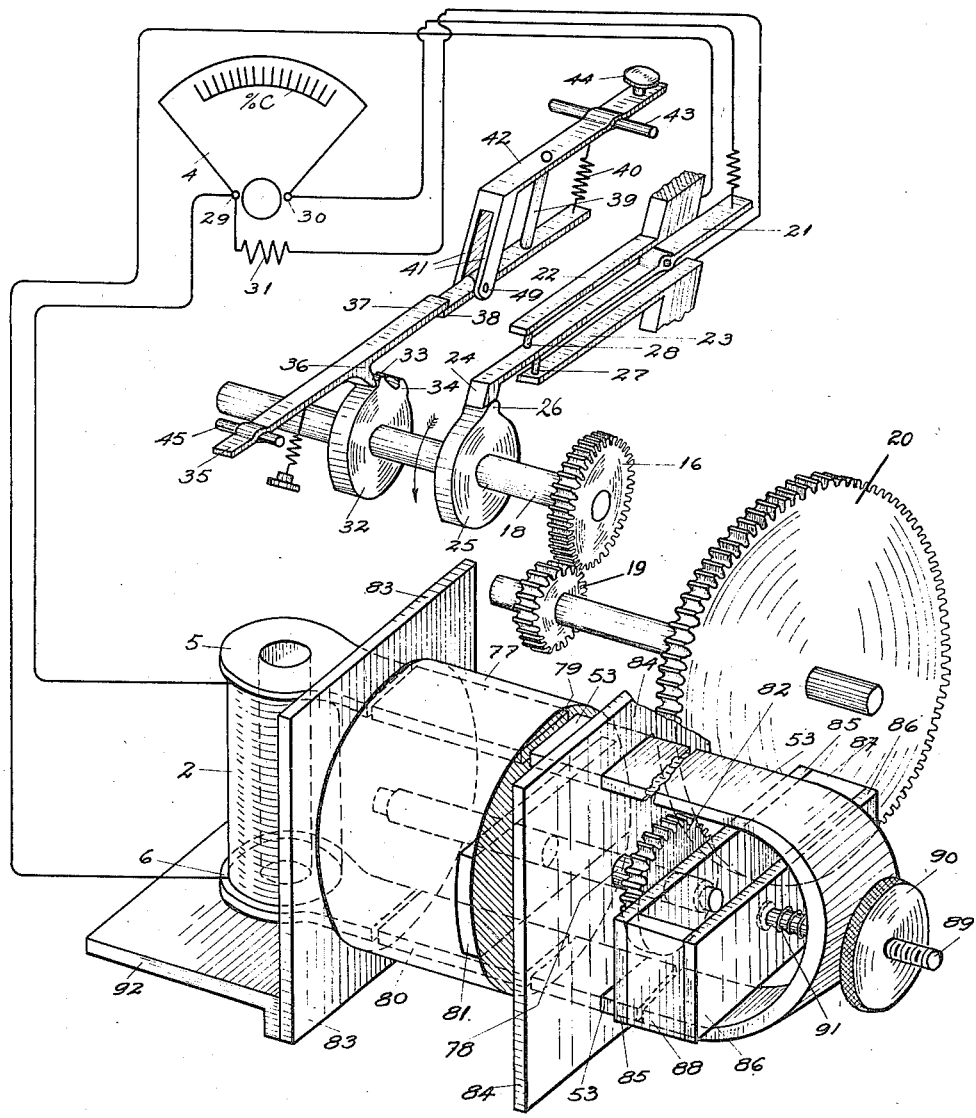

April 26, 1927. 1,626,005
C. J. G. MALMBERG ET AL
APPARATUS FOR DETERMINING THE PERCENTAGE OF CARBON IN A
SPECIMEN OF IRON OR STEEL
Original Filed Feb. 5, 1921   3 Sheets-Sheet 3
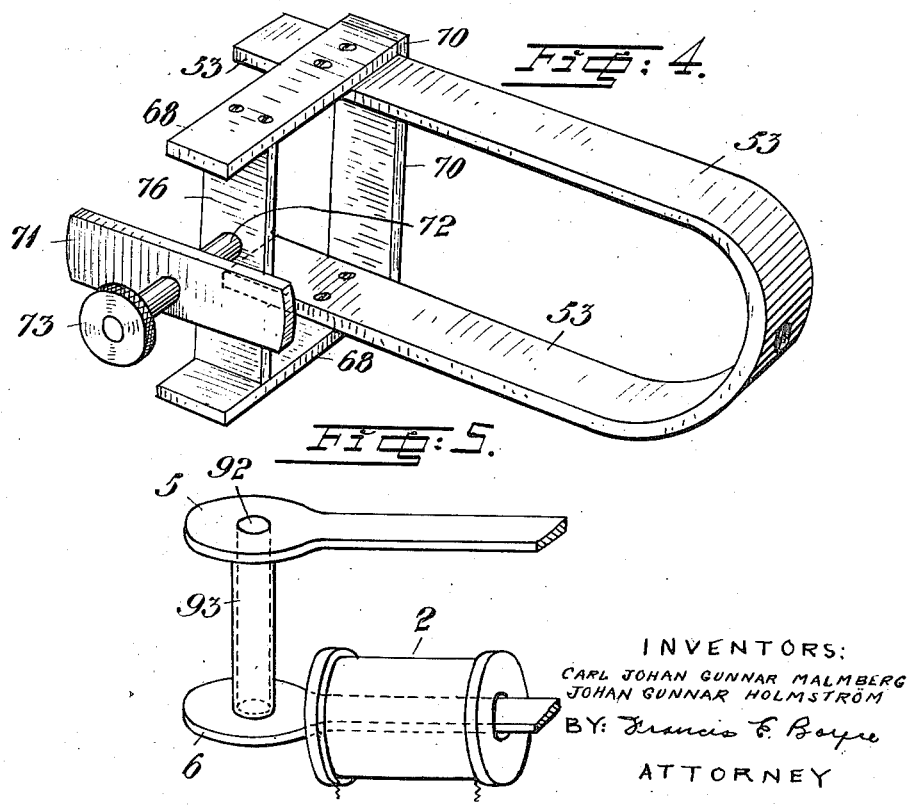

Patented Apr. 26, 1927.                                                1,626,005

UNITED STATES PATENT OFFICE.

CARL JOHAN GUNNAR MALMBERG, OF SURAHAMMAR, AND JOHAN GUNNAR HOLMSTRÖM, OF SALTSJO-STORANGEN, SWEDEN.

APPARATUS FOR DETERMINING THE PERCENTAGE OF CARBON IN A SPECIMEN OF IRON OR STEEL.

Original application filed February 5, 1921, Serial No. 442,895, and in Sweden December 22, 1917.
Divided and this application filed June 26, 1924. Serial No. 722,623.

The present invention has for its object an apparatus for determining the percentage of carbon in a specimen of iron or steel and the apparatus is constructed with regard to a measuring method which consists in subjecting the specimen to repeated magnetization and demagnetization between two chosen values of the magnetizing force and measuring the difference between the magnetic fluxes through the specimen at said two values, this application being a division of our application Serial No. 442,895, filed February 5, 1921.

It has been found that when an iron specimen is subjected to the influence of a magnetic field, which is varied several times (to and fro) between two values, the definite difference of the magnetic flux indicates the percentage of carbon of the specimen. The specimen must be magnetized and demagnetized repeatedly between the two chosen values before the difference in magnetic flux is measured, as it has been found that said difference is constant only after several magnetizations and demagnetizations.

Figure 1 in the annexed drawing explains the mere theoretical fact.

Fig. 2 represents diagrammatically the complete apparatus;

Fig. 3 is a vertical sectional view of a detail thereof; and

Figs. 4 and 5 illustrate modifications of certain elements of the apparatus.

The magnetization of the specimen is assumed to be varied between the values $H_1$ and $H_2$ of the magnetizing force. To these values correspond then the flux densities $I_1$ and $I_2$ stated on the ordinates. According to the present invention neither the values $I_1$ nor the value $I_2$ forms the basis for the determination of the percentage of carbon, but the difference between these two values.

The object of the repeated magnetization and demagnetization is also explained in Figure 1 in an enlarged scale. The highest possible flux density corresponding to the magnetizing force $H_1$ is not obtained on the demagnetization following the first magnetization. The highest possible flux density is obtained only after the specimen has been magnetized and demagnetized several times. The zigzag-line of the diagram is meant to show this progress. The curves approach gradually an ultimate position. When this position has been reached it can be said that the flux density of the specimen consists of two portions: a fixed value $I_1$ and a "loose" value $I_2 - I_1$ which latter fluctuates with the magnetizing and the demagnetizing between the two magnetizing force values $H_1$ and $H_2$. As before stated experiments have confirmed that it is this loose value or the "magnetic loss" in demagnetizing from the value $H_2$ to the value $H_1$ which can be used as a direct indication of the percentage of carbon.

It has also been found that it is advantageous with regard to accuracy and rapidity in making the test that the specimen has pronounced residual properties. In order to obtain such properties the specimen should be hardened by heating it for a sufficient period at a sufficiently high temperature and then rapidly cooling it.

In practice the "magnetic loss" between two values of the magnetizing force should be measured by means of a suitable instrument. The constant of the apparatus is determined empirically by measuring the percentage of carbon of a standard specimen. The percentage of carbon can then be read either from a curve or a table or on the scale of the instrument, empirically graduated.

The measurement of the "magnetic loss" can of course be made in various ways, for instance by means of a magnetometer or by the ballistic method. The latter method is preferred for practical reasons as the influence of external magnetic fields then can be avoided, for instance by the use of a moving coil instrument with a tightly closed magnetic circuit.

According to the present invention it is possible to measure the percentage of carbon of an iron specimen rapidly and exactly without working the specimen and independent of any external magnetic fields and iron objects. A quantity of the melting iron may consequently be taken out of the furnace for making the specimen. This method enables the decarbonization to be followed and stopped when the percentage of carbon required has been obtained.

There are, as is known, several instruments for measuring the difference in magnetic flux of certain iron specimens. However, it is not possible to use any one of these instruments directly for determining the percentage of carbon according to the above described method. Many incidental circumstances disturb and make it impossible to obtain exactly the same results, for instance for the same specimen in the same apparatus but on different occasions. Only after eliminating or reducing such circumstances to a minimum the above measuring method becomes suitable for technical purposes. The construction of a reliable magnetic measuring instrument is the object of the invention.

As pointed out above, it is necessary that the measurement of $I_2-I_1$ can be done rapidly and reliably. The ballistic method must in this connection be considered the best one. The instruments usually used in connection with the method, in which the specimen is inserted in a primary induction coil in which the current flows and an outer secondary coil connected to the ballistic galvanometer, cannot be used partly because the magnetic leakage cannot then be kept constant for the same specimen, neither with closed nor with open magnetic circuits, and partly because the heat produced by the primary current causes changes of temperature which alters the resistance of the secondary coil, and also that of the iron. In the present invention these disturbing factors have been eliminated partly by arranging magnetic screens at the two ends of the iron specimen and the secondary coil and partly by making the magnetizing and demagnetizing in an external magnetic circuit—relative to the screens, by means of a permanent magnet. The permanent magnet can be moved in relation to the remaining part of the magnetic circuit or one or more soft iron pieces can be moved between the permanent magnet and the magnetic circuit of the specimen (the screens), whereby said iron pieces when moved alternately either open and close or close and short circuit the magnetic circuit. By using permanent magnets, the heating disturbances of the primary current may be wholly eliminated. However, in order to obtain constancy also the variations in the magnetizing forces must be compensated.

In the present invention this problem is solved by using a narrow air gap, which may be adjusted and is inserted in the magnetic circuit. As the permanent magnets lose their magnetism (the changes usually occur in this direction) the air gap may be more closed, thus rendering the magnetizing and the demagnetizing constant. This air gap (or air gaps) is adjusted by inserting a "standard" in the apparatus and altering the air gap until the indiction determined for the standard has been obtained.

For facilitating the adjustment of the magnetic circuit very accurately also a magnetic shunt may be used in addition to the said air-gap. As the constancy of the instrument is, as said before, of very great importance, the circuit of the magnet as well as that of the specimen must be protected against disturbing magnetic fields which is done by enclosing the apparatus in an iron box. The magnetic leakage is thus rendered constant in each separate case and changes of the intensity of the magnetic field due to outside influences prevented.

In the above description of the method it is pointed out that the curves of magnetization and demagnetization gradually approach their ultimate position. This position is theoretically reached only after an infinite number of magnetizations, but in practice only a few such magnetizations are required. It is, however, necessary to keep the error, which arises when the magnetizations and demagnetizations are stopped too soon, so small that it does not impair the accuracy of the method. It is therefore always necessary to make preliminary magnetizations in sufficient number before the "loss" is measured. The apparatus must therefore be so constructed that this measurement cannot be made unless a certain stated number of magnetizations and demagnetizations have been made. The technical "carbometer" must therefore include a device which automatically makes these preliminary magnetizations. This is preferably carried out by means of a clockwork "Carbometers" constructed according to the above described invention are shown in Figure 2.

The apparatus shown in these illustrations consists of a coil 2 wound with many turns of insulated copper wire 3, a ballistic galvanometer 4, of suitable sensibility and damping, and a device for magnetizing and demagnetizing the specimen 1 (Figure 3) between the two magnetizing values chosen for the apparatus.

When the magnetization and the demagnetization is made, as described hereafter, the coil 2 with the winding 3, in which the specimen is placed, must be furnished with magnetic screens 5 and 6 of soft iron (see Figures 2 and 3) in order to obtain constant leakage.

The specimen should be cast in a mould and when hardened and placed in the coil, it forms an essential part of a magnetic circuit the remaining magnetic resistance of which is constant. For the purpose of preventing the head of a specimen, which head may have various shapes and sizes, from exerting any influence upon the magnetic flux in the circuit, the screens 5 and 6 are inserted. These screens are arranged at such a distance from each other (or the specimen is of such a length) that the cylindrical part of the specimen magnetically connects the plates 5 and 6, while the head 7 is completely outside the one plate.

The ballistic galvanometer 4 is of usual moving coil type and suitably furnished with a lens movable over the scale for accurate reading of the momentary indication, corresponding to the "magnetic loss" of the chosen difference in magnetizing forces.

As seen in Figure 2 the magnetic screens 5 and 6 of the coil are intended and pass through holes in the shield 83 of non-magnetic material attached to the protecting box (frame) of the apparatus.

The coil 2 is supported by the bracket 92, also attached to the shield 83. Close to the ends of the screens 5 and 6 are two long pieces of soft iron 79 and 80 movably mounted which in the position shown in the figure conduct the magnetic field emanating from the steel magnet 53 to the screens 5 and 6. The magnetic circuit then flows through the upper pole 53, the parts 79—5— the specimen, the parts 6—80— the lower pole 53. As the iron pieces 79 and 80 are movable so that they can be moved away from the position in which they conduct the magnetic field from and to the magnet 53, the field flowing through the specimen is practically diminished to a value near zero, when the iron pieces are moved away. The periodical magnetization and demagnetization is consequently made by means of the iron pieces 79 and 80 which are moved to and from the position, shown in Figure 2. This is effected in the construction now described by fixing the pieces to a rotary shaft 78, but it is evident that the motion may be a reciprocating or other motion. In the Figure 2 the pieces 79 and 80 are assumed to be fastened in a drum cast of non-magnetic material. One end of the shaft 78 is mounted in the shield 83, and the shaft extends through a hole in the shield 84, also of non-magnetic material and attached to the protecting box, and the other end is fitted in the cross piece 85 which is non-magnetic and fixed to the frame. The shaft 78 is actuated by the pinion 82 mounted on the shaft, said pinion being driven from the pinion 16 attached to a shaft 18 by means of intermeshing wheels 19, 20. The gear ratio should be such as for instance to allow the shaft 78 to make a semirevolution for a motion of the shaft 18, corresponding to the distance between two teeth of the pinion 16. When the drum 77 has turned 90° from the position shown in the figure, the specimen is demagnetized, but when it has turned 180° the specimen is again magnetized. Compensation for eventual variations is also made in this construction by inserting a standard specimen in the coil 2 and by adjusting the air gaps until the correct indication of the galvanometer is obtained. The air gaps are in this case adjusted by arranging the steel magnet so that it may be moved longitudinally, since the ends of the magnet 53 pass through the non-magnetic shield 84 by which they are guided, whilst the curved part of the magnet 53 is guided by a bolt 89 attached to the cross-piece 86 fixed to the frame of the apparatus. The upper part of the bolt is threaded and fitted with a nut 90 outside the magnet. Inside the magnet, between the magnet and the cross-piece 86 is a strong spring 91 which holds the magnet back. The horizontal position of the magnet will thus be controlled by the nut 90. By turning this nut inward the magnet 53 is moved toward the iron pieces 79 and 80, so that the air gaps are diminished. By turning the nut outward the magnet is moved backward and the air gaps between the magnet 53 and the iron pieces 79 and 80 are increased. In order to prevent leakage of magnetic flux from the magnet 53 to the screens 5 and 6 while the iron pieces 79 and 80 are turned away, the shaft 78 may be provided with an armature 81 of soft iron which then directly closes the magnetic circuit. Such an armature has moreover an important task since it acts as an armature for the magnet when the apparatus is not in use. The resting position of the drum should therefore be 90 degrees from the position shown in Figure 2.

However, independently of the method used for magnetizing and demagnetizing the specimen, that is, for closing and breaking a magnetic field flowing through the screens 5 and 6 to the specimen, the coil 2 in which the "loss" is induced may be placed in any part of the magnetic circuit. For instance, it may be placed on the screen 6, as shown in Figure 5. Between the free ends of the screens 5 and 6 a magnetic flux may, as above described, be introduced or cut off. The change of the field on magnetizing and demagnetizing the specimen takes place not only in the specimen itself but also in the screens or the pieces 5 and 6.

For compensation of eventual variations in the magnetic circuit it is suitable in addition to the adjustable air gap according to Figure 2, to use a removable magnetic shunt. Such a shunt is shown in Figure 4, in which figure the other parts of Figure 2 for sake of clearness are partly omitted.

As evident from Figure 4 the magnetic shunt is obtained by means of soft iron piece 68 which projects from the upper pole of the magnet 53, and a soft iron piece 68 which projects from the lower pole of the magnet. Between the projecting ends of the pieces 68, 68 is a soft iron piece 71 arranged in a shaft 72 which is pivotally mounted in the support 76 which as well as the shaft 72 must be of non-magnetic material. The shaft 72 is provided with a handwheel 73 by means of which the iron piece 71 may be adjusted in every desired position in relation to the iron pieces 68, 68 for variation of the magnetic shunt.

In such an apparatus the magnetic circuit first is approximately adjusted by regulating the air gaps by means of the nut 90, Figure 2, and then the exact adjustment is obtained by means of the magnetic shunt 68, 68, 71. The arrangement for driving the shaft 18 and the pinion 16 cooperating with the pinion 82 by means of the gear already mentioned, is also shown in Figure 2. The shaft 18 may be assumed to be driven by a clockwork.

When the clockwork is started the pinion 16 rotates and causes the shaft 78 to rotate. The magnetic circuit from the permanent magnet 53 through the specimen is thus closed and broken, and the specimen 1 inserted in the coil 2, is thus magnetized and demagnetized.

As above pointed out, the indication of the "magnetic loss" in the specimen should be read from the ballistic galvanometer 4 only after a sufficient number of magnetizations and demagnetizations has been made. Only in this way the "loss" is rendered practically constant, as mentioned above, so that the percentage of carbon of the specimen can be determined by measuring the amount of the "loss". The galvanometer must not be connected during these preliminary magnetizations, as it would not then be still when the definite reading is to be made. The galvanometer may be connected, for instance in the way shown in Figure 2. The circuit from the coil 2 is closed over the outer contact 29 of the galvanometer 4, over the outer contact 30 to the lever 21 and, when the end 24 of this lever is moved upward, to the contact spring 22 and from this spring back to the coil 2. During the preliminary magnetizations the end 24 is not raised, the circuit of the galvanometer is thus broken at the contact pin 28. In order to keep the galvanometer still damped it is shunted by means of a suitable resistance 31 over the contact lever 21 and the lower spring 23 by the aid of a contact 27. The lever 21 is raised by the tooth 26 of the cam 25. This is effected only when the definite indication is to be made. The cam 25 is for this purpose fixed on the same shaft 18 as the pinion 16. The clockwork and this shaft 18 are released by pressing a button 44 which acts upon a stopping lever 35 fitted with a catch 36. The catch 36 engages the teeth of the cam 32, also fixed on the shaft 18. As will be seen this cam 32 has only two teeth 33 and 34. In the original position (not that shown in the Figure 2) the tooth 34 rests against the catch 36 of the lever 35. After the iron specimen has been inserted in its place in the coil 2 the button 44 is pressed once. The lever 42 which moves on the shaft 43 is thereby raised at the end 41, where it bears the shaft 49 on which the lever 38 is fixed. The spring 40 holds the lever 38 pressed against the support 39 attached to the arm 42. The fore end of the lever 38 thus moves upward and raises the end 37 of the lever 35 but only for a moment sufficient to raise the catch 36 over the tooth 34. When the end 37 has been raised somewhat the end of the lever 38 slides off the end 37 when the lever 35 and the catch 36 again fall down on to the cam 32. As no tooth now holds the catch 36, the clockwork rotates and the pinion 16 causes the shaft 78 to rotate for effecting the preliminary magnetizations, as previously described. After a certain number of these magnetizations have been made the clockwork is stopped by the catch 36 striking the tooth 33 of the cam 32. The cams then come into the positions shown in Figure 2. While the cams are rotating, or after they have been stopped, the button 44 should be released. On releasing this button lever 42 swings on its pivot in the opposite direction, thus carrying the lever 38 into contact with the end 37 of lever 35, thereby swinging the lever 38 on its pivot into a position at an angle to the lever 35 whereby the end of the lever 38 is permitted to pass the end 37 and resume its position below the same, the spring 40, which is placed under tension by the swinging of lever 38, acting to cause the lever to assume said position, as will be obvious from Fig. 2. For reading the indication of the galvanometer 4 the button 44 is now pressed once more. The end 37 is then again raised so that the catch 36 releases the tooth 33 but falls down immediately when the lever 38 passes the end 37, as previously described. On the second pressing of the button 44 the clockwork turns the shaft 18 only the part of the way corresponding to the distance between the teeth 33 and 34 of the wheel 32. By this turning the tooth 26 operates the lever 21. The catch 24 of the lever 21 is hereby immediately raised by the tooth 26, so that the lever 21 and the spring 22 come into contact by the aid of the contact 28. The reading of the galvanometer 4 then takes place. The catch 24 now falls down from the tooth 26, breaking the circuit at the contact 28, but closing it at the contact 27. This closing must take place immediately before the pointer of the galvanometer returns from the indication back to zero. The resistance 31 is in this case so regulated that the motion of the moving coil of the galvanometer is damped or stopped and compels the pointer to stop on zero or close to it. The moment for releasing the button 44 has obviously nothing to do with this damping. However, after the button has been released the lever 38 returns to its original position below the end 37, as before described. By means of such a device which, of course, may be made in many various ways, any chance of omitting the preliminary magnetizations is prevented, and at the same time it ensures the same number of magnetizations always being made.

Having now particularly described the nature of our invention and the manner of its operation, what we claim is:

1. Apparatus for determining the percentage of carbon in a specimen of iron or steel, comprising a magnetic circuit including the specimen to be tested, and a permanent magnet for magnetizing said specimen, an induction coil wound upon a portion of said circuit, means for repeatedly varying the magnetic force between two chosen values, and a measuring instrument for measuring the difference between the magnetic fluxes through the specimen at said two values.

2. Apparatus for determining the percentage of carbon in a specimen of iron or steel, comprising a magnetic circuit including the specimen to be tested, and a permanent magnet for magnetizing said specimen, an induction coil wound upon a portion of said circuit, a part of said magnetic circuit being movable with relation to the other part, means for repeatedly varying the magnetic force between two chosen values, and a measuring instrument for measuring the difference between the magnetic fluxes through the specimen at said two values.

3. Apparatus for determining the percentage of carbon in a specimen of iron or steel, which comprises a magnetic circuit including the specimen to be tested, and a permanent magnet for magnetizing said specimen, an induction coil upon a portion of said circuit, said magnetic circuit containing an adjustable air gap, means for repeatedy varying the magnetic force between two chosen values, and a measuring instrument for measuring the difference between the magnetic fluxes through the specimen at said two values.

4. Apparatus for determining the percentage of carbon in a specimen of iron or steel, comprising a magnetic circuit including the specimen to be tested, and a permanent magnet for magnetizing said specimen, an induction coil wound upon a portion of said circuit, and a removable magnetic shunt, means for repeatedy varying the magnetic force between two chosen values, and a measuring instrument for measuring the difference between the magnetic fluxes through the specimen at said two values.

5. Apparatus for determining the percentage of carbon in a specimen of iron or steel, comprising a magnetic circuit including the specimen to be tested and a permanent magnet for magnetizing said specimen, an induction coil wound upon a portion of said circuit, magnetic screens for preventing specimens of different lengths from exerting any influence upon the result and insuring that the same length of specimen is included in the magnetic circuit when the determination is being made, means for repeatedly varying the magnetic force between two chosen values, and a measuring instrument for measuring the difference between the magnetic fluxes through the specimen at said two values.

6. Apparatus for determining the percentage of carbon in a specimen of iron or steel, comprising a magnetic circuit including the specimen to be tested, and a permanent magnet for magnetizing said specimen, an induction coil wound upon a portion of said circuit, and mechanism for controlling the variations in the magnetic circuit.

7. Apparatus for determining the percentage of carbon in a specimen of iron or steel, comprising a magnetic circuit including the specimen to be tested, and a permanent magnet for magnetizing said specimen, an induction coil wound upon a portion of said circuit, and automatically operative mechanism for varying the magnetic circuit for repeatedly magnetizing and demagnetizing the specimen.

8. Apparatus for determining the percentage of carbon in a specimen of iron or steel, comprising a magnetic circuit including the specimen to be tested, and a permanent magnet for magnetizing said specimen, an induction coil wound upon a portion of said circuit, a measuring instrument adapted to be placed in circuit with said induction coil, and means for maintaining the induction coil and measuring instrument out of electrical connection during a predetermined time and automatically operative to connect said measuring instrument and induction coil after said predetermined time.

In testimony whereof we have signed our names to this specification.

CARL JOHAN GUNNAR MALMBERG.
JOHAN GUNNAR HOLMSTRÖM.